United States Patent [19]

Osborn et al.

[11] 3,932,033
[45] Jan. 13, 1976

[54] CINEMATOGRAPH PROJECTORS

[75] Inventors: Leroy Gordon Osborn, Mill Hill;
George Hunnam Brownlee, Harrow,
both of England

[73] Assignee: Westrex Company Limited, London,
England

[22] Filed: June 21, 1974

[21] Appl. No.: 481,721

[30] Foreign Application Priority Data

June 25, 1973 United Kingdom.............. 30015/73

[52] U.S. Cl. ................ 352/228; 352/227; 352/148;
352/149
[51] Int. Cl.² ........................................ G03B 1/48
[58] Field of Search ........... 352/221, 227, 228, 148,
352/149, 150

[56] References Cited
UNITED STATES PATENTS

| | | | |
|---|---|---|---|
| 1,812,212 | 6/1931 | Meyer.............................. | 352/149 X |
| 1,872,353 | 8/1932 | Schulz............................. | 352/228 X |
| 2,461,140 | 2/1949 | Capstaff........................... | 352/148 |
| 2,506,441 | 5/1950 | Charlin............................ | 352/228 |
| 3,029,687 | 4/1962 | Veit................................. | 352/221 |

*Primary Examiner*—Monroe H. Hayes
*Attorney, Agent, or Firm*—Alan C. Rose; Thomas A. Turner, Jr.

[57] ABSTRACT

A composite projector gate, aperture and light dowser assembly for a cinematograph film projector. The film guide surface through the gate area is curved convex towards the light source, film being held to curved marginal guides by flexible bands anchored before the gate, in the direction of film motion. A quick-release anchor is provided to retain the tension springs. The projection aperture comprises a removable plate in front of which, towards the light source, are spaced-apart heat screens with a horizontally-moving light-dowser blade therebetween in a space in which is provided forced air ventilation.

9 Claims, 7 Drawing Figures

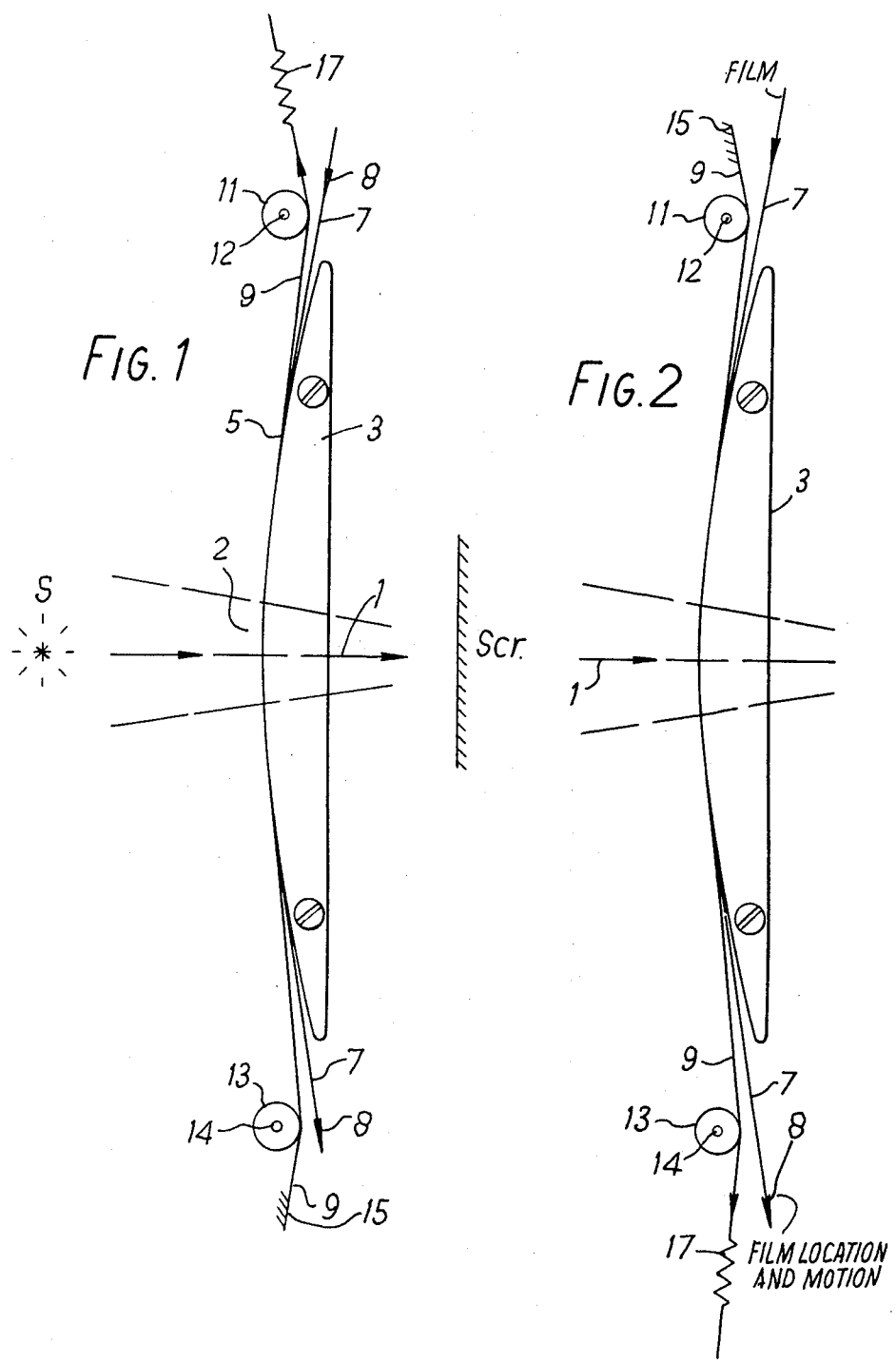

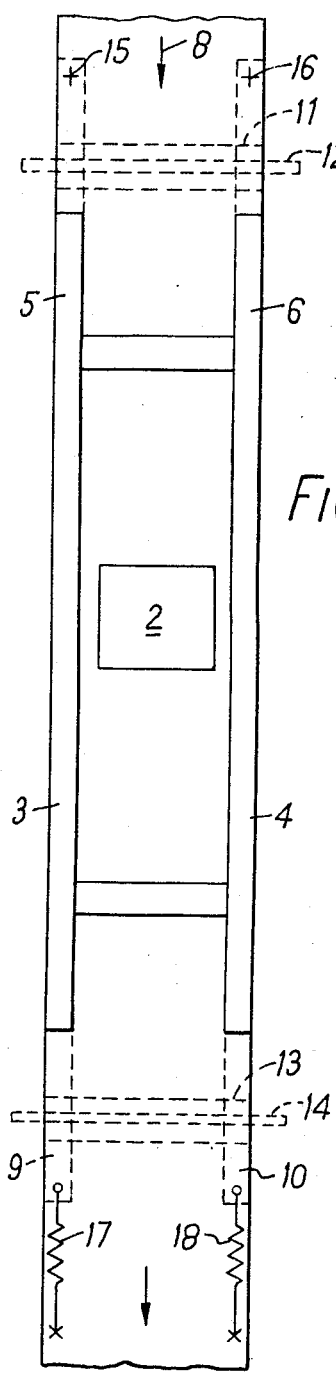
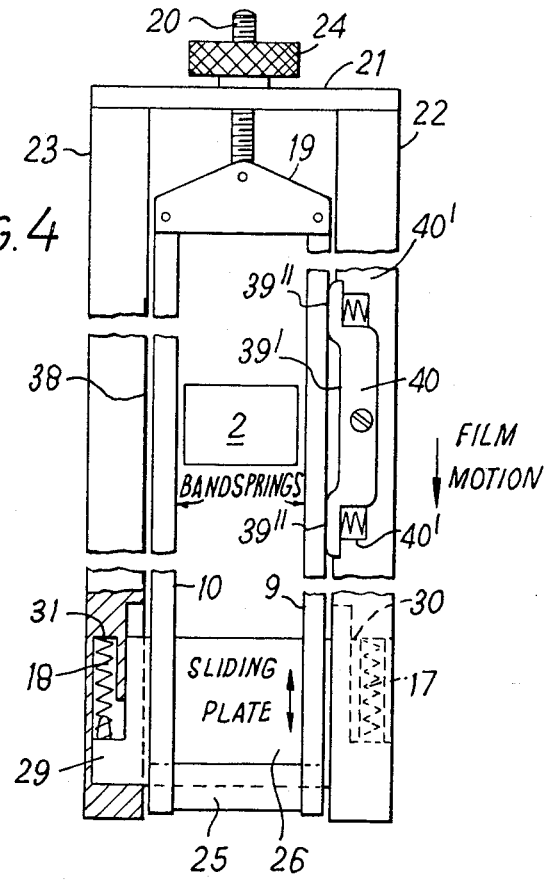
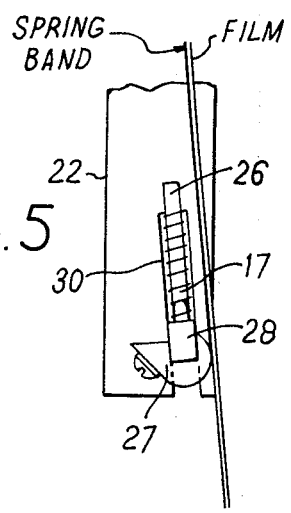

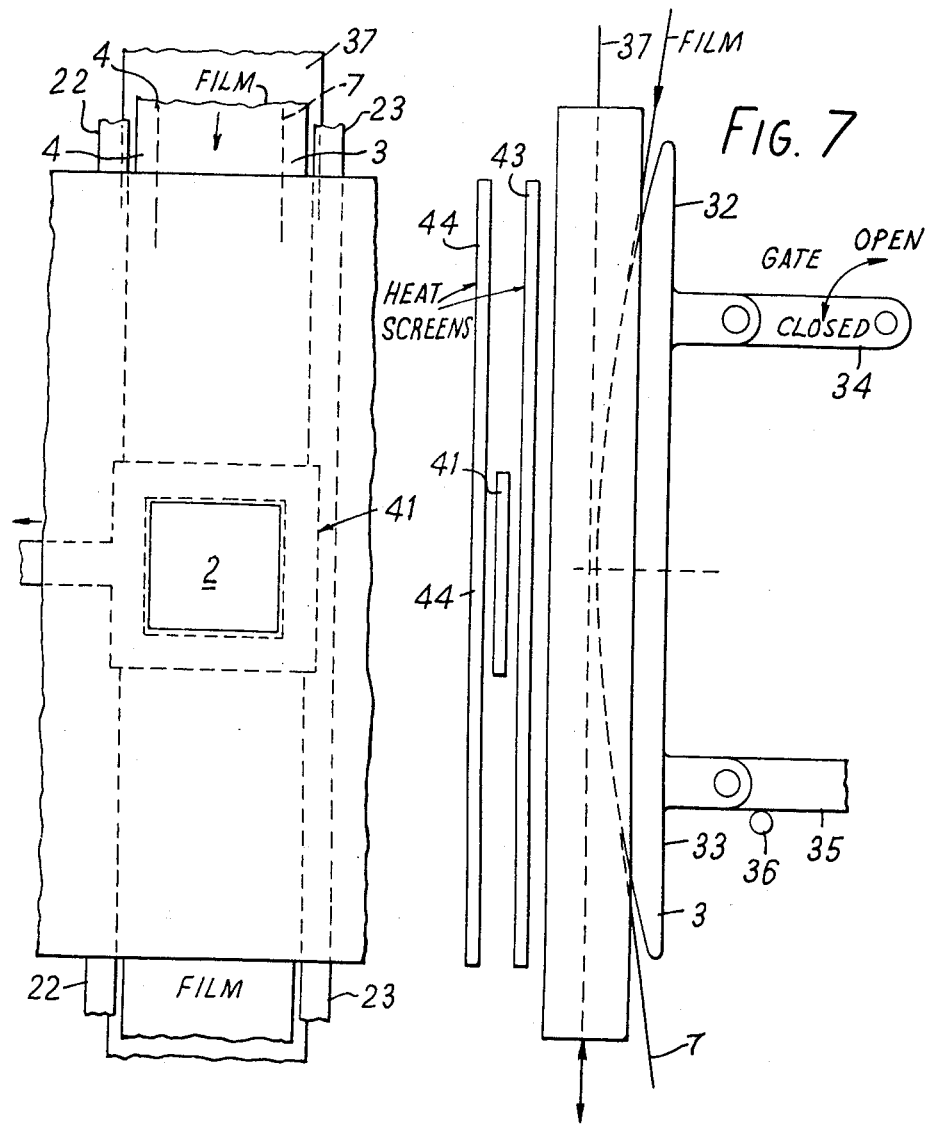

3,932,033

CINEMATOGRAPH PROJECTORS

This invention relates to cinematograph projectors and particularly to the projector gate, aperture and light-dowser elements of the projector mechanism.

In order to locate the emulsion surface of cinematograph film precisely at the object surface of the projection optics, it is known to employ a curved gate and to hold the marginal surfaces of the film against corresponding curved marginal film support surfaces of the gate by spring band pressure. The film is thus located in a defined surface with the emulsion surface of the film facing towards the light source, that is away from the gate support surfaces.

In order to provide spring band pressure, two spring bands, one pressing against each marginal surface of the film, are anchored at one end and spring-tensioned at the other.

Due to the pressure of the spring bands on the film and the friction between the band and film marginal surfaces, the spring bands tend to be dragged in the direction of film movement each time the film is moved forward through the projector gate.

It has been found that if the tension springs are located at the film-feed end of the gate, the springs are tensioned an indefinite amount due to the friction drag during the intermittent forward motion of the film. Further, at the end of the intermittent movement, the tension springs recover and the friction drag between the spring bands and the film marginal surfaces, now acting in the opposite direction of film movement, tends to return the film by an indefinite amount, thereby causing indefinite register of the film frame in the projector gate.

The object of the present invention is to provide improved cinematograph projection apparatus having regard to this and to other problems of design.

Preferably, both spring bands are attached to a support bar adapted for attachment to an anchor point located at the film feed end of the gate. Preferably, the projection aperture is provided in a removable plate, so that the aperture format can be changed at will.

Preferably, a light-dowser blade is located behind the aperture plate for horizontal movement between light-obscuring and light-projecting positions.

In order that the invention may be readily carried into practice, one embodiment thereof will now be described in detail, by way of example, with reference to the accompanying drawings, in which:

FIG. 1 is a side-elevation view of a curved film gate of known design;

FIG. 2 is a side-elevation view of a curved film gate according to the present invention;

FIG. 3 is a front view of the curved gate of FIG. 2;

FIG. 4 is a front view of a curved gate similar to that of FIGS. 2 and 3 showing a preferred manner of attachment and tensioning of the spring bands;

FIG. 5 is a detail side-elevation view of the tensioning spring arrangement of the gate of FIG. 4;

FIG. 6 is a rear view of a curved gate showing additional elements; and

FIG. 7 is a side-elevation view of the gate assembly of FIG. 6.

Referring now to the drawings, similar elements of the several constructions and views are indicated by the same reference numerals throughout the figures.

In the curved gate assembly of FIG. 1, the assembly is adapted for light from a source S to pass in the direction of the arrow 1, through a projection aperture 2 in a plane lying perpendicular to the surface of the figure, towards a screen Scr. A pair of curved film support shoes 3 and 4, of which the shoe 3 is seen in FIG. 1, provide film marginal support surfaces 5 and 6, respectively, one surface extending longitudinally each side of the aperture 2.

Cinematograph film 7 passes through the gate of FIG. 2 in the downward direction as shown by arrow 8.

A pair of spring bands 9 and 10 bear on the marginal areas of the film 7 pressing the marginal areas onto the support surfaces 5 and 6, respectively. The spring bands 9 and 10 pass over a roller 11 mounted on a fixed shaft 12 at the film feed end of the gate and over a roller 13 mounted on a fixed shaft 14 at the film take-up end of the gate. The spring blades thus form a tangent from the surface of roller 11 to the respective curved film support shoe surface and from the respective support surface tangentially to the roller 13, supporting the film against the support surfaces 5 and 6 over the whole area between the upper and lower points of contact. The film 7 is thereby guided over the support surfaces 5 and 6 with its emulsion surface facing in the direction of the light source S.

In this known arrangement, the spring bands 9 and 10 are anchored at the film take-up end of the gate, at points 15 and 16, respectively, and are tensioned by tension springs 17 and 18, respectively, located at the film feed end of the gate.

In consequence, the springs 17 and 18 are tensioned by drag on the spring bands 9 and 10 during the intermittent forward movement of the film 7. Subsequent recovery of springs 17 and 18 moves the film upwardly an indefinite amount, causing the indefinite location of the film frame in the aperture 2, as discussed earlier herein.

In the curved gate assembly according to the invention shown in FIGS. 2 and 3, the anchor points 15 and 16 are located at the film feed end of the gate and the tension springs 17 and 18 are located at the film take-up end of the gate.

In consequence, drag upon the spring bands 9 and 10 by the film 7 in intermittent motion is resisted by an equal reaction at the anchor points 15 and 16. There is no longitudinal displacement of the spring bands 9 and 10 therefore, and the springs 17 and 18 remain uniformly tensioned.

In either the arrangement of FIG. 1 or the arrangement of FIGS. 2 and 3, the pressure of the spring bands 9 and 10 upon the film marginal area may be adjusted by varying the tension of the springs 17 and 18.

A preferred manner of attachment and of tensioning the spring bands 9 and 10 is shown in FIGS. 4 and 5. As shown in FIG. 4, the spring bands 9 and 10 are attached by pivot anchor points 15 and 16 respectively to a tension balance bar 19 itself pivotally attached to a screw retaining member 20. The screw 20 extends through an apertured end bar 21 attached to film side guides 22 and 23 of the gate assembly at the film feed end thereof. The screw 20 is adjustably retained in the apertured bar 21 by a knurled nut 24.

At the film take-up end of the gate assembly, the spring bands 9 and 10 are bridged by a hooked bar 25 which engages the lower edge of a sliding plate 26. The plate 26 is provided at its lower, outer ends with lugs 28 and 29 and slides, at its upper end, in a channel 30 formed in the film side guides 22 and 23.

The sliding plate 26 is urged downwardly by the action of tensioning springs 17 and 18 which, in this embodiment, are compression springs which are retained in bores 30 and 31 formed in the film side guides 22 and 23, respectively, and which tension the spring bands 9 and 10 by abutment against the lugs 28 and 29 of the hooked bar 25.

Removal of the spring band assembly for replacement, or otherwise, is effected by loosening the nut 24 on the screw 20 and allowing the spring bands 9 and 10 to move downwardly to disengage the hooked bar 25 from the plate 26.

Tensioning of the spring bands is effected by tightening the nut 24 which draws the bands and the attached bar 25 upwardly to compress the springs 17 and 18.

Other constructional features of a preferred embodiment of the invention are shown in FIGS. 6 and 7. As there shown, the curved film supports 3 and 4 each have forwardly extending lugs 32 at the top and forwardly extending lugs 33 at the bottom and the film supports 3 and 4 are moved and located by a parallel motion comprising pivoted arms 34 at the top and pivoted arms 35 at the bottom. The spring bands 9 and 10 bear on the marginal areas of the film 7 pressing it onto the curved surfaces 5 and 6 of the film supports 3 and 4 in the manner described in detail previously herein.

In the closed position of the gate, the curved film supports 3 and 4 are located by a stop 36 against which the lower arms 35 abut at a position before rearward deadcentre of the parallel motion rotation. Thus, the downward motion of the film, by frictional drag on the curved surfaces 5 and 6, tends to hold the gate closed during the forward motion of the film but tends to open the gate to relieve film pressure during reverse running of the film.

The film side guides 22 and 23 are provided with a straight, narrow channel on their inwardly facing surfaces to receive edgewise and to locate an aperture plate 37. The aperture plate 37 is pierced to provide the aperture 2 and it will be noted from the view of FIG. 7 that the aperture is located in a plane only a very small distance rearward of the film 7 emulsion surface, to ensure that the edges of the projected picture are well-defined.

The aperture plate 37 is longitudinally movable in the channel in the film side guides 22 and 23 and may be removed for replacement by another aperture plate 37 having a different aperture 2 format, for example for Cinemascope (Registered Trade Mark) projection. Alternatively, a single aperture plate 37 may have several apertures 2 of different formats pierced therein and be movable longitudinally between corresponding locating stops, not shown, to bring the aperture 2 of required format into register with the projection optics, not shown.

By a quick release spring, not shown, the aperture plate 37 can be easily and quickly removed for initial trimming of the aperture to compensate for any keystone effect of the projected image on a cinema screen, due to the angle of projection.

Film side guides are provided in the usual manner and these are shown particularly in the view of FIG. 4. The side guides comprise a pre-set, hardened steel guide 38 attached to the left hand gate frame member, as viewed in FIG. 4. This guide abuts the reference edge of the projected film. A second side guide is located at the right hand side of the gate frame member, as viewed in FIG. 4, and is a self-balancing compression guide 40 comprising an inner surface 39 centrally recessed at 39' to provide upper and lower abutment faces 39'', the whole guide member being biassed by upper and lower compression springs 40'.

In contrast to the usual arrangements for light dowsers and changeover units in cinematograph projectors, which usual arrangements are large, heavy and gravity closed, the arrangements shown in FIG. 6 and FIG. 7 are lightweight and include a horizontally moving dowser blade. Thus, the light-dowser blade 41 is mounted to move horizontally in bearing surfaces which are on the side of the projector main plate opposite from the light source and are thus unaffected by the high temperature of the light beam.

Screening of the aperture plate is further provided by two Sindanyo (Registered Trade Mark) heat screens 43 and 44. These are mounted in spaced-apart relationship from each other to accommodate the dowser blade 41 and to permit of a rising air current therebetween. Forced ventilation is provided by a small fan, not shown. It is found that the assembly does not overheat with air cooling and that water cooling of the gate is not necessary.

In this embodiment, the dowser blade 41 is made of Duralumin and is of some 3 square inches area. The horizontal movement of the dowser blade 41 between its open and light-obscuring positions is effected by small and simple solenoid means, not shown.

The fact that the movement required is horizontal means that the dowser blade 41 stays in either open or light-obscuring position after it has been moved. Continuous energisation is not required either for an opening or for a closing solenoid and the dowser blade 41 will not move from its set position until the appropriate actuating solenoid is next energised.

What we claim is:

1. Cinematographic film projection apparatus at each side of a projection aperture including a projection gate having film marginal support surfaces convexly curved toward a light source, comprising in combination:
   a. a plurality of flexible bands, at least one band extending respectively over each of said marginal support surfaces and pressure biased toward said marginal support surfaces whereby film passing between said flexible band and said film marginal support surfaces is pressed onto the said support surfaces;
   b. means feeding film to said aperture at a first side thereof, and taking up said film at a second side thereof; and
   c. each of said flexible bands positioned anchored on said first aperture side, and tensioned on said second aperture side.

2. Cinematograph apparatus as claimed in claim 1 in which each of the said plurality of flexible bands is attached on said first side of said projection aperture to the ends of a bar extending transversely between the said bands, said bar being pivotally attached at its center to a screw retaining member adjustably attached to a transverse anchor bar.

3. Cinematograph apparatus as claimed in claim 2, in which the said pair of flexible bands are attached, at the film take-up end, to the ends of a tensioning bar, which is spring-biased in the direction to tension the said bands.

4. Cinematograph apparatus as claimed in claim 3, in which the tensioning bar is formed with hook members for engagement with a longitudinally slidable plate, which is spring-biassed in the direction to tension the said bands.

5. Cinematograph apparatus as claimed in claim 1 wherein said convexly curved film marginal support surfaces comprise a first hinged link positioned on the film feed side of said projection aperture, which hinged link is pivotally mounted to a longitudinal lug, and further comprising a second hinged link parallel to said first hinged link and positioned on the film take-up side of said projection aperture, said second hinged link pivotally mounted to a second longitudinal lug parallel to said first longitudinal lug; and further comprising stop means preventing the downward movement of said convexly curved marginal film support surfaces when said marginal film support surfaces are in operating contact with said film; whereby said convexly curved marginal film support surfaces are hingedly movable out of contact with said film in a direction opposite the direction of film movement within the projection gate.

6. Cinematograph apparatus as claimed in claim 5, in which the said projection aperture is defined by a removable apertured plate.

7. Cinematograph apparatus as claimed in claim 6, in which the said apertured plate is retained between a pair of side guides and is longitudinally movable in channels therein.

8. Cinematograph apparatus as claimed in claim 6, in which a light-dowser blade is arranged between the said apertured plate and the projection light source and is adapted for horizontal movement between light-obscurring and light projecting positions.

9. Cinematograph apparatus as claimed in claim 8, in which the said light-dowser blade is positioned between a pair of spaced-apart heat screens.

* * * * *